(12) United States Patent
Petro

(10) Patent No.: US 10,722,927 B2
(45) Date of Patent: Jul. 28, 2020

(54) PURGE, CLEANING AND LUBRICATION FILAMENT

(71) Applicant: Mark A. Petro, Windsor (CA)

(72) Inventor: Mark A. Petro, Windsor (CA)

( * ) Notice: Subject to any disclaimer, the term of this patent is extended or adjusted under 35 U.S.C. 154(b) by 214 days.

(21) Appl. No.: 15/718,256

(22) Filed: Sep. 28, 2017

(65) Prior Publication Data

US 2018/0085794 A1   Mar. 29, 2018

Related U.S. Application Data

(60) Provisional application No. 62/401,239, filed on Sep. 29, 2016.

(51) Int. Cl.
| | | |
|---|---|---|
| *C11D 3/37* | (2006.01) | |
| *B08B 9/027* | (2006.01) | |
| *B33Y 30/00* | (2015.01) | |
| *B29C 64/35* | (2017.01) | |
| *B33Y 40/00* | (2020.01) | |
| *B29C 64/118* | (2017.01) | |

(52) U.S. Cl.
CPC ............ *B08B 9/027* (2013.01); *B29C 64/118* (2017.08); *B29C 64/35* (2017.08); *B33Y 30/00* (2014.12); *B33Y 40/00* (2014.12)

(58) Field of Classification Search
CPC .................................................. C11D 11/0041
USPC .......................................................... 510/188
See application file for complete search history.

(56) References Cited

U.S. PATENT DOCUMENTS 6,001,188 A * 12/1999 Walsh ................... B29C 33/722
134/7
2016/0101553 A1* 4/2016 Moore ..................... B29C 48/27
264/39

FOREIGN PATENT DOCUMENTS

WO      2016/019719 A1    2/2016

\* cited by examiner

*Primary Examiner* — Gregory E Webb
(74) *Attorney, Agent, or Firm* — Carlson, Gaskey & Olds, P.C.

(57) ABSTRACT

A disclosed purge filament for cleaning and lubricating a nozzle of a 3-D printing machine includes a carrier resin from 85 to 99.005% by volume of the purge filament, a lubricant between 0.5% to 10% by volume of the purge filament, and a cleaning agent between 0.005 to 5% by volume of the purge filament. The purge filament is utilized as part of a method of cleaning a 3-D printing machine to dissolve and remove residue while cleaning and lubricating internal surfaces of an extruding head and nozzle.

28 Claims, 2 Drawing Sheets

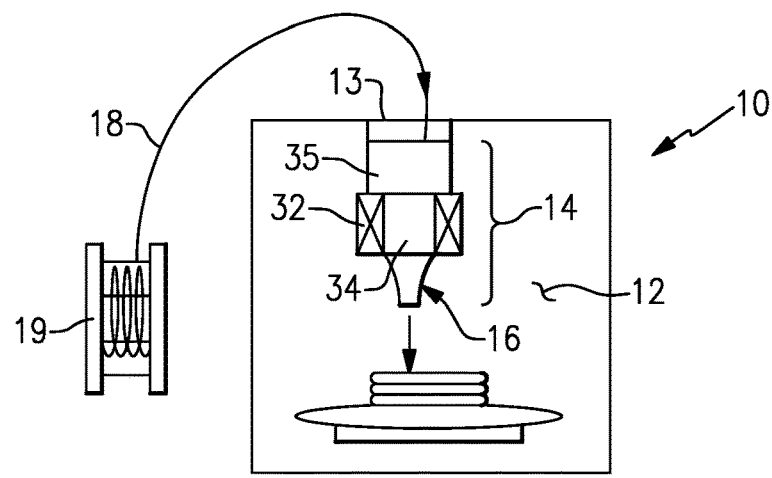
FIG.1
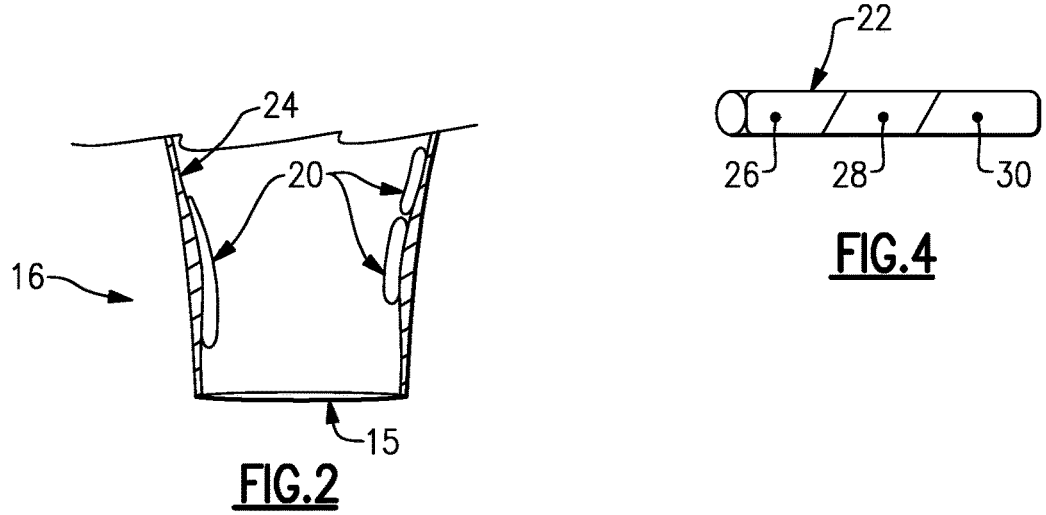
FIG.2
FIG.4
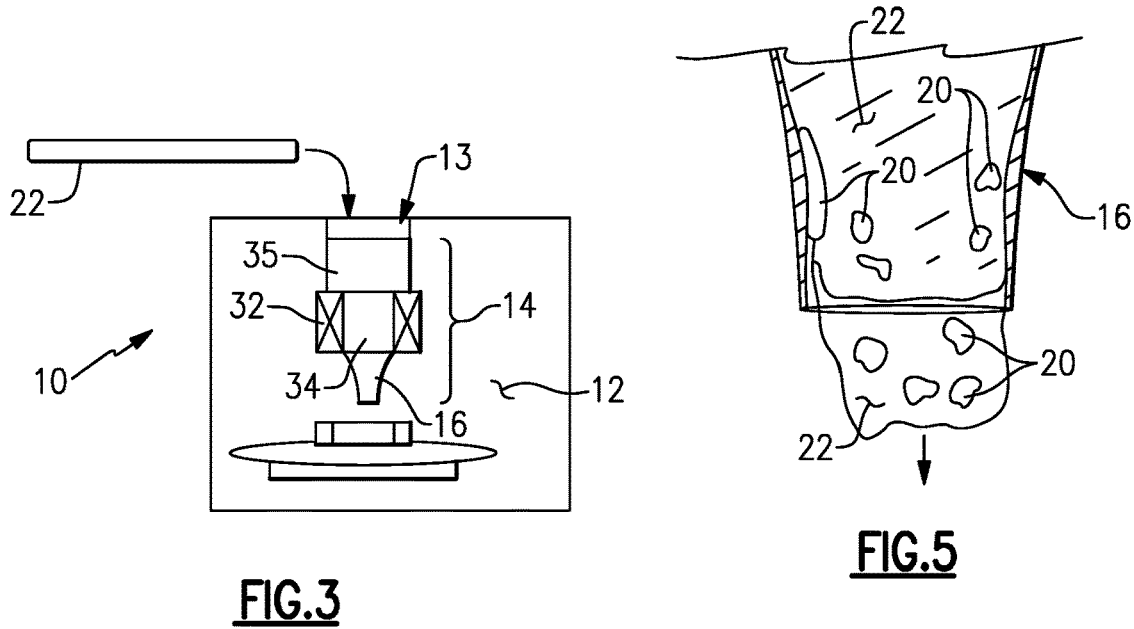
FIG.3
FIG.5

PURGE, CLEANING AND LUBRICATION FILAMENT

CROSS REFERENCE TO RELATED APPLICATION

This application claims priority to U.S. Provisional Application Ser. No. 62/401,239 filed on Sep. 29, 2016.

BACKGROUND

Additive manufacturing machines that form shapes and products layer by layer utilizing a plastic material are becoming increasingly affordable and therefore are increasing in use across all industries. Additive manufacturing machines are also referred to as 3-D printers as they utilize a plastic or otherwise thermally conformable material that is fed into a workspace to form a desired shape according to a desired design.

3-D printing machines use a filament made of plastic (such as PLA, ABS. Nylon, Polycarbonate) or other materials including waxes, clay blends, wood shavings, or metals (as just some examples) to print. The printers work by heating the filament to a molten/liquid state and the pressing them through an extrusion nozzle in a precise way allowing them to be made into specific shapes, patterns and forms resulting in a 3-dimensional product being made.

Over time and repeated use, as the extruder nozzle heats the plastic to a target temperature some material clings to inner surfaces where the remnant material repeatedly heats and cools, resulting in a crust that is effectively "overcooked" much like burning a pot on a stove. This crust can cause a variety of problems including clogging/blockage of the extruder and ultimately complete failure of material to pass through the extrusion nozzle.

Currently, most 3-D printing machines are not purged or cleaned to remove build-up of film, dirt, dust, environmental contamination, cross contamination or from regrind/recycled material added to the filament in the original filament manufacturing process. As a result, extruder heads and nozzles are currently run with no preventive maintenance or lubrication provided until they fail and are replaced. Failure of the extruder head, nozzle and nozzle orifice are further accelerated from the lack of any preventive maintenance and the resulting build-up of film, dirt, contaminants and remnants of poor quality filament materials.

Materials are not currently readily available in a useful form or format that provides cleaning, purging and lubricating 3-D printing machine outfeed components.

SUMMARY

An exemplary embodiment of this disclosure, among other possible things includes a purge filament for cleaning and lubricating a nozzle of a 3-D printing machine. The disclosed purge material includes a carrier resin from 85 to 99.005% by volume of the purge filament, a lubricant between 0.5% to 10% by volume of the purge filament, and a cleaning agent between 0.005 to 5% by volume of the purge filament. The purge filament is utilized as part of a method of cleaning a 3-D printing machine to dissolve and remove residue while cleaning and lubricating internal surfaces of an extruding head and nozzle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example 3-D printing machine and purge filament.

FIG. 2 is a schematic view of a residue within a portion of an example nozzle of the 3-D printing machine.

FIG. 3 is a schematic view of an example method of removing residue from the 3-D printing machine.

FIG. 4 is a schematic view of an example purge filament for removing residue from within a nozzle of a 3-D printing machine.

FIG. 5 is a schematic view of a portion of the nozzle filled with the purge filament.

DETAILED DESCRIPTION

Figure 6:
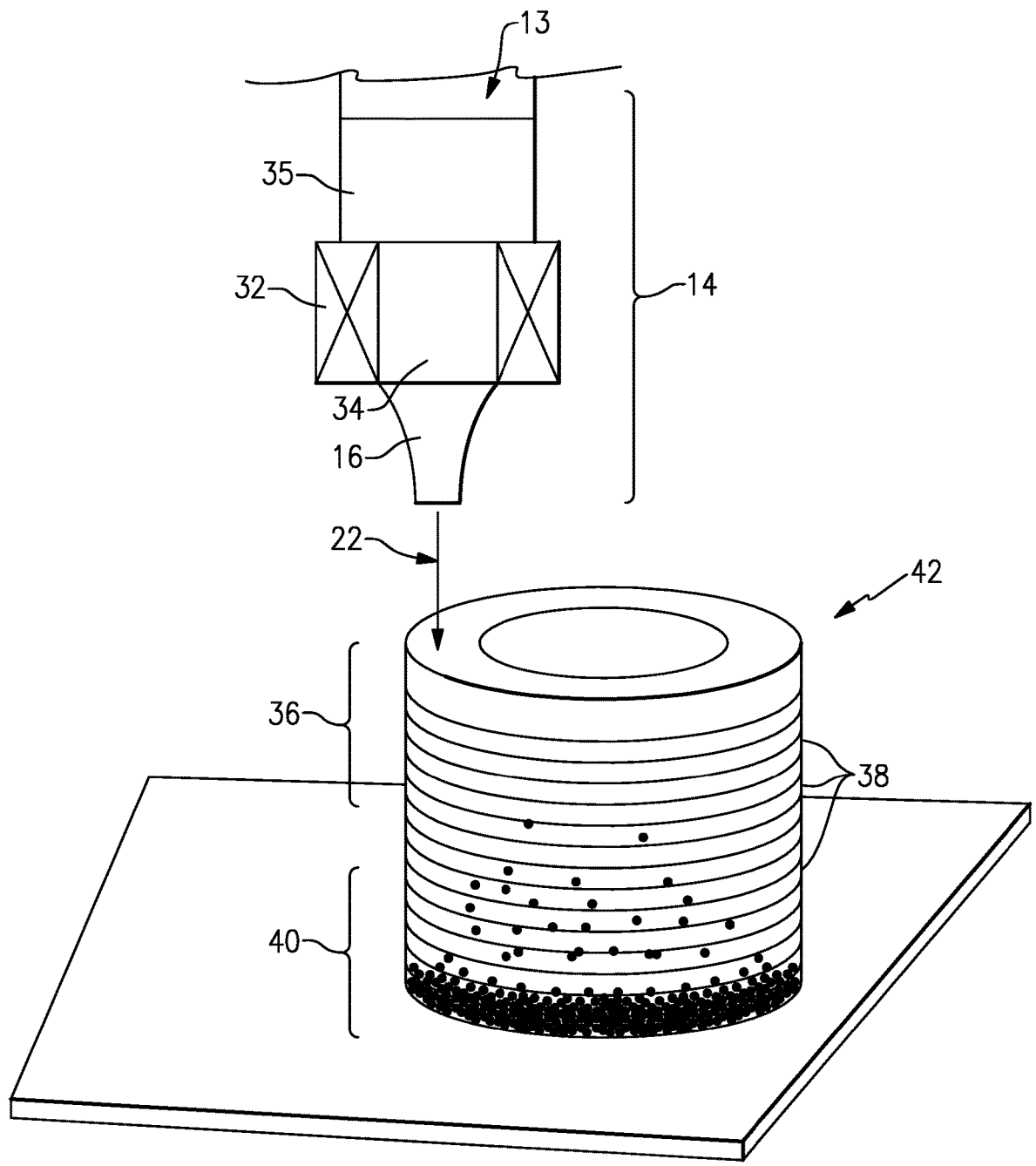
FIG. 6 is a schematic view of a method of removing residue from a 3-D printing machine.

Referring to FIGS. 1 and 2, a 3-D printing machine 10 is schematically shown and includes a workspace 12 and an extruding head assembly 14. The extruder head assembly 14 includes a feed tube 35, a hot end 34, a heating element 32 and an extruding nozzle 16. A filament material 18 is feed through an opening 13 in the feed tube 35 into the hot end 34 and out through the nozzle 16 to form layers in a pattern to generate a desired shape and completed product. The filament material 18 is contained on a spool 19 and fed through the feed tube 35, and hot end 34 of the extruding head assembly 14 into the nozzle 16. The material 18 is heated by the heating element 32 to a molten temperature in the hot end 34 and pushed through an orifice 15 of the nozzle 16 into the workspace. The extruding head assembly 14 and nozzle 16 are moved within the workspace 12 to define a desired part geometry.

Normal filament material 18 (feedstock) used in 3-D printing machines is abrasive and over time and with no lubrication being added, wear an inside surface 24 of the hot end 34 and extruder nozzle 16. Excessive wear can degrade performance and cause premature failure of the extruder head assembly 14 and nozzle 16. The extruder head assembly 14 and nozzle 16 are complex, expensive components and therefore extending the useful operational life of each is desirable.

The interior surface 24 will over time accumulate residue material or a crust as is shown schematically at 20. The residue 20 may include burned or chard remnants of the material 18 and contaminants that are not expelled through the nozzle orifice 15 and that detrimentally effect performance Removing the residue 20 including burned/charred material effectively is paramount to maintaining reliability in a 3-D printing machine. Accordingly, a disclosed purge filament 22 (FIGS. 3 and 4) provides for cleaning and conditioning the interior surfaces of the heating chamber and extruder nozzle.

Referring to FIGS. 3 and 4, a disclosed example purge filament 22 includes a combination of materials and additives that clean and lubricate the interior surfaces 24 of the extruding head assembly 14. It should be appreciated that although the extruder head assembly 14 is disclosed by way of explanation, any heated structure that contacts the filament material 18 would benefit from cleaning with the disclosed purge filament 22 and is within the contemplation of this disclosure.

In one disclosed embodiment, the purge filament 22 comprises a filler material, also known as carrier resin 26, a lubricant 28 and a cleaning agent 30. In one disclosed embodiment, the carrier resin comprises between 85 and 99.005% by volume of the purge filament 22. The lubricant comprises between 0.5% and 2% by volume of the purge filament 22. The cleaning agent comprises between 1% and 3% of the volume of the purge filament 22. In another disclosed embodiment, the carrier resin 26 comprises approximately 85 to 99.005% by volume of the purge filament 22, the cleaning agent 30 comprises approximately 0.005 to 5% by volume of the purge filament 22 and the lubricant 28 comprise approximately 0.5 to 10% by volume of the purge filament 22. The components of the purge filament 22 are combined to form a homogenous mixture in a form visibly similar to the filament 18 used for forming products.

The carrier resin 26 is a high-density material with a high molecular weight that effectively penetrates, loosens, breaks down and then flushes-out the burned/charred/caked-on/crusted pieces trapped in the extruder head, nozzle and nozzle orifice. In this example embodiment, the carrier resin 26 is of a linear nature with few branches having molecules packed closer together and intermolecular bonds that are stronger than commonly utilized polymers. The resulting rigid crystalline structure is more than about 90% crystalline and provides a tensile strength greater than 3800 psi, approximately 550% elongation and a flexural Modulus greater than about 180,000 psi. The example carrier resin 26 further is provided with a density greater than about greater than about 0.941 g/cm$^3$. The example carrier resin 26 further includes a hardness of between 62 and 67 on a Shore D scale as measured in accordance with ASTM standard 2240. The example carrier resin 26 is chemically inert and resistant to ultraviolet radiation as compared to other polymers to improve effectiveness in grabbing weaker and broken down polymer materials adhered to the interior surface 24 of the nozzle 16.

Additionally, the example carrier resin 26 is less permeable when compared to other materials to improve lubricity and flow. The properties of the example carrier resin 26 impact effectiveness and the ability to push and pull contaminants and residue from the extruder head assembly 14 and nozzle 16. The carrier resin 26 is universally compatible with all 3-D printing machine applications as well is the lubricant 28 and cleaning agent 30.

The carrier resin 26 provides a carrier function that lifts and holds crusted particles 20 in suspension when put through the machine and effectively floats the dissolved crusted pieces out through the nozzle 16. The carrier resin 26 is heated in the extruder head assembly 14 and becomes liquefied within the nozzle 16 and hot end 34. The liquefied carrier resin 26 encapsulates and floats out trapped and old material from the nozzle 16 at any temperature above a glass transition temperature (melting point) of the carrier resin 26.

Lifting and holding crusted particles enables more efficient operation and functioning of the cleaning agent 30. With some, or most of the crusted particles lifted from the surfaces of the nozzle 16, the cleaning agent 30 is able to more effectively dissolve crusted and over cooked plastic that has accumulated inside of the extruder head assembly 14 and flush the contaminates through the nozzle 16. In one example embodiment, the cleaning agent 30 is temperature activated at temperatures in excess of 100° C. (212° F.).

The lubricant 28 provides lubricity to the carrier resin 26 to aid in moving the carrier resin and residue material through the nozzle 16. The example lubricant 28 includes an organic heterocycle that features both amine and other functional groups in the chemical compound. The lubricant 28 contains a fatty acid that occurs naturally in various animal and vegetable fats and oils. The fatty acid is an odorless, colorless oil that is safely used on food products and produce. The lubricant further includes an ultra-high weight polymer dispersed in a styrene-acrylonitrile carrier that optimizes performance by liquefying and reducing operating pressure within the extruder head assembly 14 and nozzle 16. The lubricant 28 keeps the carrier resin 26 and the cleaning agent 30 freely moving to reduce wear. Additionally, the lubricant 28 provides a lubrication function inside the extrusion nozzle that remains to some extend once the purge filament material is flushed from the nozzle.

The cleaning agent 30 is comprised of a material formulated to effectively dissolve/strip off any contaminants trapped in the extruder and floats them out the end of the extruder nozzle 16. The cleaning agent 30 includes a specific gravity greater than 1.12. Additionally, the cleaning agent includes an abrasive component having transformation temperature greater than 100° C. (212° F.).

Temperatures significantly above 100° C. (212° F.) provide a deeper cleaning of the extruder head assembly 14 as the components 26, 28 and 30 of the filament 22 work well at temperatures above the glass transition temperature or melting point of the resin that is built up within the head assembly 14. Moreover, at the higher temperatures, the carrier resin 26 effectively penetrates crusted and cooked bits of plastic that have solidified on the inside of the hot end 34 and nozzle 16. One desired temperature is 5° C. below the maximum operating temperature of the machine 10. The higher temperatures increases the efficiency of removing material remaining such that it is dissolved, liquefied and excreted through the nozzle 16. The maximum temperate may liquefy any remaining resin causing popping, spurting of the purge filament 22 as it exits the nozzle 16.

The disclosed purge filament may be used with all types of FDM, FFF, PJP 3-D printing machines to keep the critical extruder head assembly 14, nozzle 16 and nozzle orifice 15 clean. The purge filament 22 cleans and lubricates the extruder nozzle 16 in one single step. In use, the disclosed purge filament 22 provides for the removal of hardened contaminants and residue that builds up over use that can plug the extruder head assembly 14 and nozzle 16 and cause failure. The purge filament 22 is provided in a defined length that is pushed through the extruder head assembly 14 and nozzle 16 in a process similar to normal filament 18. Additionally, the composition of the purge filament 22 cleans and lubricates the interior surfaces 24 of the nozzle 16.

In the event that the extruder head assembly 14 is completely clogged, inserting the purge filament 22 into the feed tube 35, hot end 34 and nozzle 16 and repeatedly pecking the filament 22 into the clog, pulling the filament 22 out, cutting off the tip of the purge filament 22 that shows signs of crusted material and repeating the process may clear the assembly 14 sufficiently to allow a deeper purge to salvage the extruder head assembly 14 and nozzle 16.

Referring to FIGS. 3, 4 and 5, in one disclosed example process for cleaning an extruder head assembly 14, an initial step includes setting a temperature of the extruding head assembly 14. In one disclosed embodiment the temperature is set to +175° C. or approximately (+350° F.) or above. Note that this temperature may be in excess of temperatures used for the formation of a product using normal filaments.

Once the temperature is properly set, approximately 8-12 inches of the purge filament 22 is feed into the extruding head assembly 14 and extruder nozzle 16. The amount of purge filament 22 may be either feed from a spool, inserted as a defined length or as a stick. In this disclosed embodiment the purge filament 22 is of a circular cross-section. The purge filament may be between about 90-180 cubic millimeters for 1.75 mm diameter feed stock. Another disclosed embodiment may be 150-300 cubic millimeters for 3 mm diameter feed stock. The specific size is adapted to correspond with each size of the heat chamber and the extrusion nozzle 16.

In some machines, a filament feed or start filament mode may be required to feed the length of purge filament into the machine. Other machines may require a manual feed. The specific machine configuration will dictate how the purge filament 22 is feed into the extruding head assembly 14 and nozzle 16 and are all are within the contemplation of this disclosure.

Once the purge filament 22 is in place, the temperature is increased to a temperature about 5° C. (or approx. 10° F.) below the maximum temperature rated for a specific machine. The increased temperature causes the purge filament 22 to form a puddle as it comes out the nozzle 16 and may even spurt or spray as it is expelled through the nozzle 16.

The expelled purge filament material is examined for signs of contamination and burnt bits. Additional lengths of purge filament 22 are feed through the extruder head assembly 14 until there are no apparent signs of contamination in the puddle or expelled purge material. The purge filament provides the deepest cleaning at temperatures higher than that typically utilized to form a part. In some machines that temperature is approximately 5° C. (10° F.) below the maximum rated temperature of the 3-D printing machine 10.

Once the expelled purge material no longer shows evidence of contaminants and residue, the temperature is lowered back down to 185° C. or temperatures where typically utilized for formation of a part. In this example, the temperature is approximately 185° C., however, other temperatures as are compatible with the purge material are within the contemplation of this disclosure.

Referring to FIG. 6, with continued reference to the other figures, a disclosed method of cleaning the extruder head assembly 14 and nozzle 16 includes printing a part of defined geometry including a height and thickness with the purge filament 22. Printing of the part further provides for a visual indication of the removal of residue. In this discloses example, a ring 42 about 1" in diameter, ½" high with a wall thickness of about ⅛" thick is generated using the purge filament 22. Note that the specific dimensions are only one example embodiment, other sizes and shapes are within the contemplation of this disclosure. The ring 42 will be one consistent uniform color if the extruder nozzle 16 is clean. The lower parts indicated at 40 will be of a color indicating the presence of residue. As additional layers 38 are formed, the color should become clearer and more closely correspond with the color of the purge filament 22. In one disclosed embodiment, the material generates a uniform gradient in the upper ¼ of the printed ring indicated at 36 while the lower portion 40 of the ring 42 will have signs of the contaminants.

If the material color is not uniform additional purge filament is run through the extruder head assembly 14 and nozzle 16 at increased temperatures until the gradient in the color of the test ring 42 indicates that residue has been cleared. This step is repeated as needed until the residue is clear and the ring 42 provides a visual indication without significant color variation. The amount of residue within extruder head assembly 14 and nozzle 16 will determine how many iterations are necessary.

Alternatively, the purge filament 22 may be inserted through an opening 13 in the extruder head assembly 14 at an elevated temperature until the purge filament contacts residue material. The purge filament 22 is than removed back through the opening 13 in the extruder to remove residue material attached to the purge filament 22 followed by removing of a portion of the purge filament 22 to free the residue material attached to the purge filament 22 followed by reinserting the purge filament 22 to remove additional residue material. This process is repeated to loosen, grab and remove material from the extruder head assembly 14 and nozzle 16 until a passage is formed that enables the purge filament 22 to be run through. This pick and grab process if for instances where the extruder head assembly 14 and nozzle 16 are extremely clogged and totally plugged.

It is contemplated that the disclosed purge filament and process are used every time the material composition or color of the filament is changed. Moreover, starting every run of the machine with a small amount of the purge filament 22 loaded in the extruder will significantly extend the life of the extruder nozzle and printer head assembly. Start-up and shut-down temperatures may vary depending on the machine type and in disclosed embodiment are within a range of between about 165-190° C. (330-375° F.).

Accordingly, the disclosed purge filament 22 and process of cleaning provide increased life and improved operability of 3-D printing machines.

Although specific embodiments have been disclosed, a worker of ordinary skill in this art would recognize that certain modifications would come within the scope of this disclosure. For that reason, the following claims should be studied to determine the true scope and content of this disclosure.

What is claimed is:

1. A purge filament for cleaning and lubricating a nozzle of a 3-D printing machine, the purge filament comprising:
   a carrier resin from 85 to 99.005% by volume of the purge filament, wherein the carrier resin has a density greater than about 0.941 g/cm;
   a lubricant between 0.5% to 10% by volume of the purge filament; and
   a cleaning agent between 0.005 to 5% by volume of the purge filament.

2. The purge filament as recited in claim 1, wherein the carrier resin has a hardness of between 62 and 67 Shore D.

3. The purge filament as recited in claim 1, wherein the cleaning agent has a specific gravity greater than 1.12.

4. The purge filament as recited in claim 3, wherein the cleaning agent includes an abrasive component, the abrasive component having a transformation temperature greater than 100° C. (212° F.).

5. The purge filament as recited in claim 1, wherein the lubricant includes a fatty acid.

6. The purge filament as recited in claim 5, wherein the lubricant includes an ultra-high weight polymer dispersed in a styrene-acrylonitrile carrier.

7. The purge filament as recited in claim 1, wherein the purge filament comprises a substantially circular cross-section.

8. A purge filament for cleaning and lubricating a nozzle of a 3-D printing machine, the purge filament comprising:

a carrier resin from 85 to 99.005% by volume of the purge filament, wherein the carrier resin has a hardness of between 62 and 67 Shore D;

a lubricant between 0.5% to 10% by volume of the purge filament; and a cleaning agent between 0.005 to 5% by volume of the purge filament.

9. The purge filament as recited in claim 8, wherein the carrier resin has a density greater than about 0.941 g/cm³.

10. The purge filament as recited in claim 8, wherein the cleaning agent has a specific gravity greater than 1.12.

11. The purge filament as recited in claim 8, wherein the lubricant includes a fatty acid.

12. The purge filament as recited in claim 11, wherein the lubricant includes an ultra-high weight polymer dispersed in a styrene-acrylonitrile carrier.

13. A purge filament for cleaning and lubricating a nozzle of a 3-D printing machine, the purge filament comprising:

a carrier resin from 85 to 99.005% by volume of the purge filament, wherein the carrier resin has a hardness of between 62 and 67 Shore D;

a lubricant between 0.5% to 10% by volume of the purge filament; and a cleaning agent between 0.005 to 5% by volume of the purge filament.

14. The purge filament as recited in claim 13, wherein the carrier resin has a density greater than about 0.941 g/cm³.

15. The purge filament as recited in claim 13, wherein the cleaning agent has a specific gravity greater than 1.12.

16. The purge filament as recited in claim 13, wherein the lubricant includes a fatty acid.

17. The purge filament as recited in claim 16, wherein the lubricant includes an ultra-high weight polymer dispersed in a styrene-acrylonitrile carrier.

18. A purge filament for cleaning and lubricating a nozzle of a 3-D printing machine, the purge filament comprising:

a carrier resin from 85 to 99.005% by volume of the purge filament;

a lubricant between 0.5% to 10% by volume of the purge filament, wherein the lubricant includes a fatty acid; and a cleaning agent between 0.005 to 5% by volume of the purge filament.

19. The purge filament as recited in claim 18, wherein the carrier resin has a density greater than about 0.941 g/cm³.

20. The purge filament as recited in claim 18, wherein the carrier resin has a hardness of between 62 and 67 Shore D.

21. The purge filament as recited in claim 18, wherein the cleaning agent has a specific gravity greater than 1.12.

22. The purge filament as recited in claim 18, wherein the lubricant includes an ultra-high weight polymer dispersed in a styrene-acrylonitrile carrier.

23. A purge filament for cleaning and lubricating a nozzle of a 3-D printing machine, the purge filament comprising:

a carrier resin from 85 to 99.005% by volume of the purge filament, wherein the carrier resin has a density greater than about 0.941 g/cm³;

a lubricant between 0.5% to 10% by volume of the purge filament, the lubricant includes an ultra-high weight polymer; and a cleaning agent between 0.005 to 5% by volume of the purge filament.

24. The purge filament as recited in claim 23, wherein the carrier resin has a hardness of between 62 and 67 Shore D.

25. The purge filament as recited in claim 24, wherein the cleaning agent has a specific gravity greater than 1.12.

26. The purge filament as recited in claim 25, wherein the cleaning agent includes an abrasive component, the abrasive component having a transformation temperature greater than 100° C. (212° F.).

27. The purge filament as recited in claim 24, wherein the lubricant includes a fatty acid.

28. The purge filament as recited in claim 27, wherein the ultra-high weight polymer is dispersed in a styrene-acrylonitrile carrier.

* * * * *